US006873762B1

(12) United States Patent
Wang et al.

(10) Patent No.: US 6,873,762 B1
(45) Date of Patent: Mar. 29, 2005

(54) FABRICATION OF FIBER OPTIC GRATING APPARATUS AND METHOD

(75) Inventors: Ying Wang, Albuquerque, NM (US); Anup Sharma, Huntsville, AL (US); Joseph Grant, Meridianville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 187 days.

(21) Appl. No.: 10/118,626

(22) Filed: Apr. 8, 2002

(51) Int. Cl.[7] .............................................. G02B 6/34
(52) U.S. Cl. ................................. 385/37; 438/31
(58) Field of Search ........................ 385/37, 126, 128, 385/141; 438/31

(56) References Cited

U.S. PATENT DOCUMENTS

| | | | |
|---|---|---|---|
| 5,367,588 A | * 11/1994 | Hill et al. ............... | 385/37 |
| 5,912,999 A | 6/1999 | Brennan, III et al. | |
| 6,014,480 A | 1/2000 | Baney | |
| 6,043,497 A | 3/2000 | Quetel et al. | |
| 6,072,926 A | 6/2000 | Cole et al. | |
| 6,188,705 B1 | 2/2001 | Krainak et al. | |
| 6,221,565 B1 | 4/2001 | Jain et al. | |
| 6,222,973 B1 | 4/2001 | Starodubov | |
| 6,297,894 B1 | * 10/2001 | Miller et al. ............ | 359/35 |
| 6,307,617 B1 | * 10/2001 | Nishiki et al. .......... | 355/53 |
| 6,549,705 B1 | * 4/2003 | Laming et al. .......... | 385/37 |
| 6,591,039 B2 | * 7/2003 | Rondinella et al. ..... | 385/37 |
| 2003/0035623 A1 | * 2/2003 | Wilcox et al. ........... | 385/37 |

FOREIGN PATENT DOCUMENTS

WO    WO 99/22256    5/1999

OTHER PUBLICATIONS

Y. Wang, J. Grant, A. Sharma, & G. Myers; Modified Talbot Interferometer for Fabrication of Fiber–Optic Grating Filter Over a Wide Range of Bragg Wavelength and Bandwidth Using a Single Phase Mask; Journal of Lightwave Technology; pp. 1569–1573; Oct. 2001; vol. 19, No. 10.

* cited by examiner

*Primary Examiner*—Joseph Williams
*Assistant Examiner*—Peter Macchiarolo
(74) *Attorney, Agent, or Firm*—James J. McGroary; Ross F. Hunt, Jr.

(57) ABSTRACT

An apparatus and method for forming a Bragg grating on an optical fiber using a phase mask to diffract a beam of coherent energy and a lens combined with a pair of mirrors to produce two symmetrical virtual point sources of coherent energy in the plane of the optical fiber. The two virtual light sources produce an interference pattern along the optical fiber. In a further embodiment, the period of the pattern and therefore the Bragg wavelength grating applied to the fiber is varied with the position of the optical fiber relative the lens.

18 Claims, 2 Drawing Sheets

FABRICATION OF FIBER OPTIC GRATING APPARATUS AND METHOD

STATEMENT REGARDING FEDERALLY SPONSORED RESEARCH

The invention described herein was made in the performance of work under a NASA contract and is subject to the provisions of Public Law 96-517 (35 USC 202) in which the contractor has elected not to retain title.

BACKGROUND OF THE INVENTION

1. Field of the Invention

The present invention relates to an apparatus and method for fabricating fiber-optic gratings, and in particular, fabricating fiber-optic gratings over a wide variety of Bragg wavelengths and bandwidths.

2. Background of the Invention

Fiber-optic Bragg gratings have become important components in modern telecommunication systems and fiber sensing systems. A fiber-optic Bragg grating consists of a longitudinal, periodic variation in the refractive index in the core of an optical fiber. When light propagates through a fiber grating, Bragg diffraction causes one wavelength to be selectively reflected. The wavelength at which high reflectivity occurs is determined by the period of the grating.

A grating writing system imparts a desired Bragg grating onto an optical fiber. One of the considerations for the grating writing system is its capability of fabricating gratings over a large wavelength range in a precisely controlled manner.

Fiber-optic Bragg grating is typically produced by exposing the optical fiber to an intense ultraviolet (UV) interference pattern of two interference UV beams. The resulting Bragg grating will have a period which is the same as that of the UV interference pattern. It is critical to precisely control the angle between the two interference UV beams for precision fabrication of the fiber gratings.

Two conventional techniques which utilize an UV interference pattern to produce fiber gratings with the necessary accuracy include an interferometric method and a phase-mask method. In the interferometric method, a single laser beam is split into two components, which are subsequently recombined at the optical fiber to produce an interference pattern. The period of the pattern is controlled by rotating two mirrors.

The phase-mask method utilizes a diffraction grating to split a single laser mainly into +1/−1 diffractive orders. Interference between the two first diffractive orders creates a fixed pattern in the optical fiber. The period of the pattern is determined discretely by using different phase masks.

A disadvantage of the interferometric method is that this method tends to be complicated to implement and requires a high degree of optical alignment, mechanical stability, and precision adjustment. A disadvantage of the phase-mask method is that this method does not have the flexibility of tuning a Bragg wavelength. In order to vary the Bragg wavelength written to an optical fiber, a different phase mask is required for each Bragg wavelength.

An additional method for fabricating an optical fiber grating is provided by U.S. Pat. No. 5,912,999 to Brennan, III et al. (hereinafter "Brennan") which uses a writing beam to form a periodic intensity distribution of period Λ while the optical fiber is translated relative to the intensity distribution at a velocity v(t). Unlike an interference pattern written method, the period of the fiber Bragg grating is not determined by the interference pattern from the phase mask.

In the Brennan method, the period of the fiber Bragg grating is determined by the frequency of the laser intensity modulation and the velocity by which the fiber is translated. Since the precision of the Bragg wavelength various inversely with the size of the beam, the smaller the beam size, the more precise the fiber Bragg grating wavelength imparted. Therefore, the beam size has to be very narrow in order to produce a desired and an accurate grating. For example, Brennan teaches a beam diameter of less than approximately ten microns.

A disadvantage with the Brennan method is that the movement of the optical fiber perpendicular to the writing beam may cause vibration to the optical fiber thereby affecting the fiber Bragg grating applied thereto. An additional disadvantage with the Brennan method is that the method and apparatus require a high degree of precision in optical fiber movement control.

Yet another method for fabricating a fiber Bragg grating is that of U.S. Pat. No. 6,072,926 to Cole et al. (hereinafter "Cole") which is directed to forming optical waveguide gratings using a writing laser to generate a grating pattern on an optical fiber while moving the optical fiber perpendicular to the writing beam. The period of the fiber Bragg grating is varied by smearing the interference pattern. A phase mask is used to form an interference pattern.

One disadvantage with the Cole method is that the grating strength tends to decrease as the index of modulation gets averaged or "washed out" when the optical fiber moves too quickly through the interference pattern formed by the phase mask. Therefore, the Cole method has a limited range of Bragg wavelength shift. In addition, like the Brennan method, since the optical fiber is moving perpendicular to the writing beam while the fiber Bragg grating is being written, vibration of the optical fiber may affect the accuracy of the fiber Bragg grating produced.

An additional method for fabricating a fiber Bragg grating is provided by WO 99/22256 to Lamin et al. (hereinafter "Lamin") which uses a converging optical system comprising a positive lens downstream of a phase mask and which adjusts the period of the fiber Bragg grating by moving either or both the optical fiber or the lens. Lamin teaches that tuning of the period of the interfering beams and hence the resulting Bragg wavelength, can be achieved by varying the distance between the lens and the phase mask. A disadvantage with Lamin is that the Lamin method is very sensitive to fiber position due to the nature of its converging optical system.

BRIEF SUMMARY OF THE INVENTION

The present invention concerns a method and apparatus for fabricating fiber Bragg grating on an optical fiber. The present technique involves the use of a phase mask to diffract a beam of coherent energy into two symmetric virtual light sources of coherent energy. A cylindrical lens in combination with a pair of mirrors are used to recombine the two virtual light sources as an interference pattern directed to an optical fiber. Bragg wavelength of the fiber gratings may be controlled by varying the distance between the optical fiber and the lens via translation of the optical fiber and/or the lens; the bandwidth of the fiber gratings may be controlled by varying the grating length via translation of the phase mask and/or the optical fiber.

In accordance with one aspect of the present invention, an apparatus is provided for fabricating fiber-optic gratings on an optical fiber. The apparatus includes a laser adapted to direct a beam of coherent energy along an initial beam path which defines a first axis. A phase mask is disposed in the initial beam path for diffracting the beam into a first diffracted beam along a first diffracted beam path and a second diffracted beam along a second diffracted beam path. Each of the first and second diffracted beam paths having a component in a second axis located perpendicular to the first axis. A lens is disposed downstream from the phase mask in both the first diffracted beam path and the second diffracted beam path. Advantageously, in one embodiment of the present invention, the lens comprises a cylindrical lens. Two mirrors, one each disposed in the first and second diffraction beam path, respectively, are provided for combining the first and second diffracted beams together to form an interference field directed to the optical fiber.

In one further embodiment, the phase mask is translatable along the first axis.

In an alternative embodiment, the Bragg wavelength grating to be applied to the optical fiber is adjustable by translating the optical fiber within the interference field along the first axis.

According to another aspect of the present invention, a method is provided for fabricating fiber-optic gratings on an optical fiber which includes directing, along a first axis, a beam of coherent energy to a phase mask element which diffracts the beam of coherent energy into two divergent diffracted beams. The divergent beams are passed through a lens and are redirected to form an interference field. An optical fiber is located in the interference field to form a fiber-optic grating on the optical fiber.

In further alternative embodiments, the phase mask is translated along the first axis to vary a center position of the interference field along the first axis.

In another alternative embodiment, the method includes selecting a desired Bragg wavelength to be applied to the optical fiber by varying the distance along the first axis between the optical fiber and the lens.

In yet a further alternative embodiment, the optical fiber is tilted in a plane defined by the first and second axes to a predetermined angle relative the first axis to apply a desired chirped grating to the optical fiber.

One feature of the present invention relates to a method of fabricating a fiber-optic Bragg gratings with large wavelength tunability using a single phase mask. The Bragg wavelength is precisely controlled by simple translation of the optical fiber on which the grating is produced.

An additional feature of the present invention is provided by chirped grating which can be fabricated by rotating, i.e., tilting, the optical fiber in the x–y plane. The bandwidth of the chirped grating is controlled by the angle of the fiber relative to the x axis or the length of the grating.

Yet an additional feature of the present invention is provided by the precise controlling of the Bragg wavelength of the optical fiber via one dimensional translation of the optical fiber relative to the lens along the x axis. This precise control is provided by the interference pattern which is produced by two fixed virtual point light sources spaced away from the optical fiber. As a result, a very high precision of wavelength tuning may be achieved using a standard micrometer translation stage since, in one form of the invention, translation of one millimeter of optical fiber corresponds to 5–10 nanometer change in Bragg wavelength.

An additional feature of the present invention is provided by the interference pattern being relatively stable and insensitive to mechanical vibration due to the high symmetry and compactness of the whole system which includes mirrors and lens in fixed positions and the fixed position of two virtual point light sources which are independent of the translation of the phase mask.

One importance advantage of the present invention is provided by near-uniform grating with wavelength precisely tuned via selectively translating the optical fiber along the x axis to a desired position to varying the distance between the optical fiber and the lens.

Further features and advantages of the present invention will be set forth in, or apparent from, the detailed description of preferred embodiments thereof which follows.

BRIEF DESCRIPTION OF THE DRAWINGS

The invention will now be described in detail with respect to preferred embodiments with reference to the accompanying drawings, wherein.

DETAILED DESCRIPTION OF THE INVENTION

The present invention produces fiber Bragg grating using two virtual point light sources in place of two actual coherent point light sources. Operation of the present invention is first described with reference to FIG. 1 which depicts a point P (x, y) of an optical fiber 12 in the interference field of two coherent point light sources 14, 16 which are at a wavelength $\lambda$ and located at (0, h) and (0, −h) respectively.

The fiber 12 is in the x–y plane and makes an angle of $\delta$ with the x axis. Varying angle $\delta$ allows for fabricating both normal as well as slanted gratings.

Figure 1B:
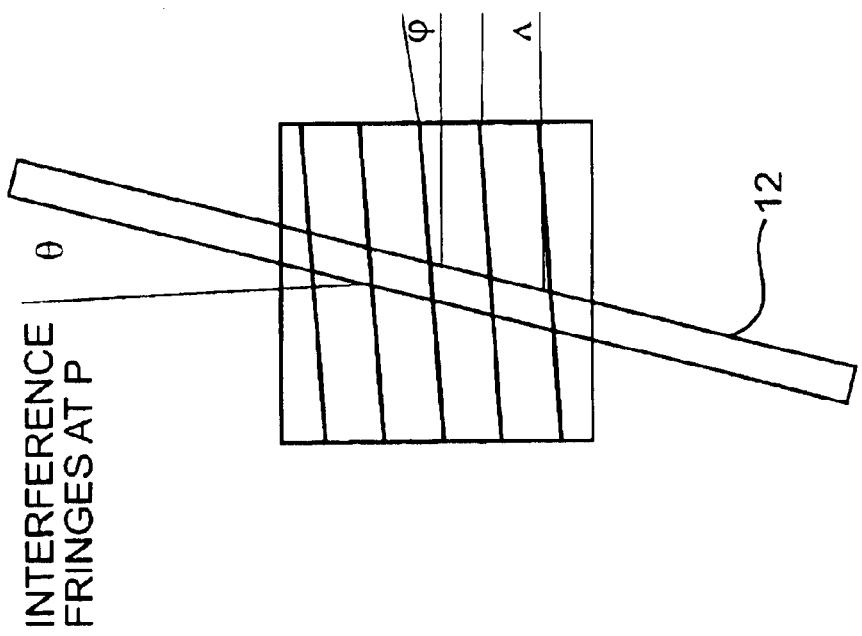
FIG. 1b is an enlargement of a portion of FIG. 1a, depicting interference fringes at a point therein.
Figure 1A:
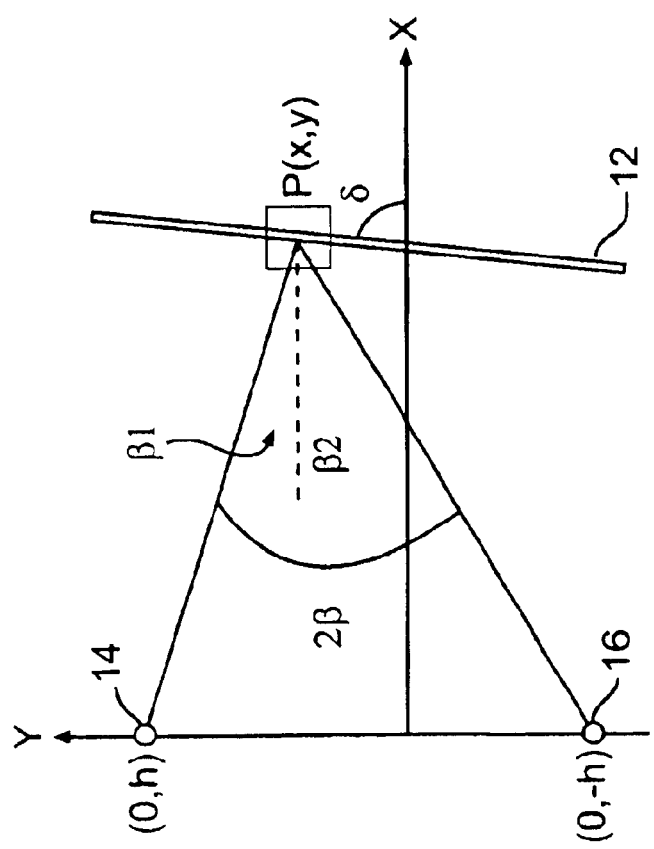
FIG. 1a is a ray diagram depicting fabrication of Bragg gratings by two point sources.

The period $\Lambda$ of the interference pattern along the fiber direction is given by the following expression:

$$\Lambda = \frac{\lambda}{2\sin\beta \, \cos\theta} \quad (1)$$

where, as shown in FIG. 1, $$\theta = 90° - \delta + \varphi \quad (2)$$

$$\beta = \frac{1}{2}(\beta_2 + \beta_1) \quad (3)$$

$$\varphi = \frac{1}{2}(\beta_2 - \beta_1) \quad (4)$$

$$\beta_1 = \tan^{-1}\left(\frac{h-y}{x}\right), \text{ and} \quad (5)$$

$$\beta_2 = \tan^{-1}\left(\frac{h+y}{x}\right). \quad (6)$$

The Bragg wavelength $\lambda_B$ of the grating at the point P(x, y) is given by the following expression:

$$\lambda_B = \frac{n\lambda}{\sin\beta \cos\theta} \quad (7)$$

where n is the refractive index of the fiber core.

Because of the location of the point light sources, the Bragg gratings written by them are chirped. From equations (1)–(6), the period of the fiber gratings changes along the fiber length. The bandwidth of the fiber grating filter resulting from this chirp is given by the following expression:

$$\Delta\lambda = \lambda_B(\max) - \lambda_B(\min) \quad (8)$$

where the maximum filtering wavelength $\lambda_B(\max)$ is calculated by equation (7) using the parameters of one farther end point of the grating; the minimum wavelength $\lambda_B(\min)$ is the extreme minimum value of $\lambda_B$ derived from equation (7). As will be apparent to one skilled in the art, the chirped fiber-grating bandwidth increases with the grating length.

Figure 2:
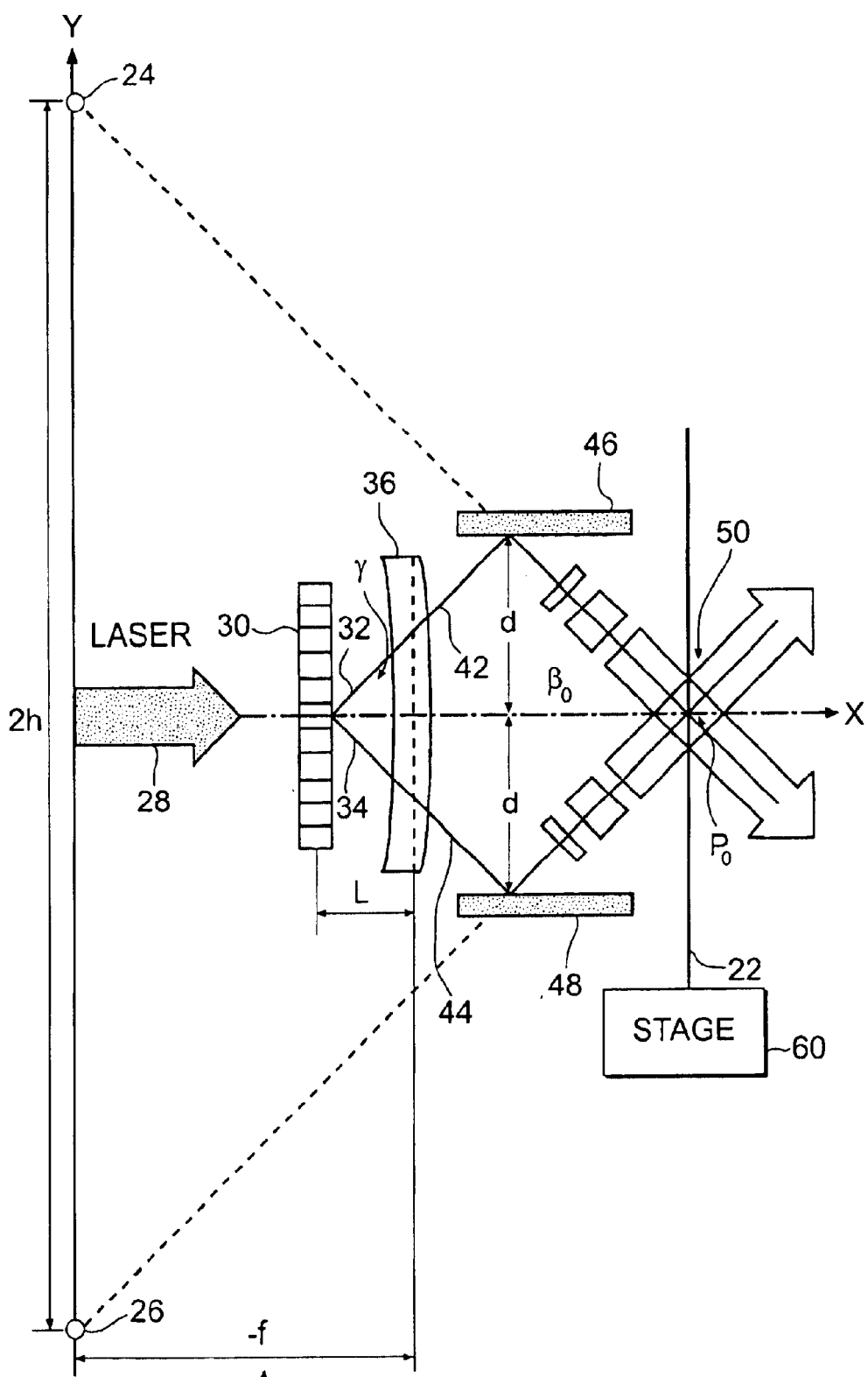
FIG. 2 is a schematic view of an optical setup for producing fiber Bragg grating according to the present invention.

Referring now to FIG. 2, optical setup 20 provides an apparatus for fabricating fiber optical Bragg grating on fiber 22. The optical setup 20 includes two virtual coherent point light sources 24, 26. A plane wave 28 of wavelength, λ=244 nm, propagates along x axis, and is incident normally on a phase mask 30 having a period ρ. Assuming that only plus/minus first orders and zero order emerge from the phase mask, two separated diffracted beam plane waves 32, 34 are symmetrically produced at an angle γ about the zero order which is along the x axis. The diffraction angle γ is determined by the laser wavelength λ and the period ρ of the phase mask:

$$\gamma = \sin^{-1}\left(\frac{\lambda}{p}\right), \quad (9)$$

A concave cylindrical lens 36 having a negative focal length f is disposed with its optical axis perpendicular to the x–y plane, behind, i.e., downstream from, the phase mask 30. Lens 36 converts the two plane wavefronts 32, 34 into two cylindrical wavefronts 42, 44 respectively.

A pair of parallel mirrors 46,48 with distance 2d between them is symmetrically set about the x axis behind the cylindrical lens 30. The mirrors 46, 48 are used to recombine the two diffracted beams to form an interference field 50. In the x–y plane, the shape of this interference field 50 appears similar to a rhombus and looks as if produced by the two point sources 24, 26. The center position $P_0$ of the interference field 50 is determined by the following expression:

$$x_o = \frac{h}{\tan\beta_o} \quad (10)$$

where, as shown in FIG. 2, $$h = 2d - f\tan\gamma \quad (11)$$

and $$\beta_o = \tan^{-1}\left(\frac{f-L}{f}\tan\gamma\right). \quad (12)$$

Applying elementary geometrical optics, the positions of the virtual light sources 24, 26 are not affected by the translation of the phase mask 30. Thus the formation of Bragg gratings imparted to an optical fiber is also relatively insensitive to the translation of the phase mask 30. Maintaining the lens and mirrors in fixed positions, fixes the positions of the two virtual light sources 24, 26.

The position of the interference field 50 centered at $P_O$ moves along the x axis as the phase mask 30 translates by distance L. However, the Bragg wavelength does not change as the phase mask 30 is translated along the x axis. As will be described later, translation of phase mask 30 along the x axis is used to extend the range of Bragg wavelength of the fiber-grating.

The optical setup 20 can be used to produce wavelength tunable fiber and chirped gratings by introducing curvature onto the incident wavefront and or tilting the fiber. The curvature is introduced onto the diffracted wavefront by putting the lens 36 behind the phase mask 30. This arrangement does not affect the incident beam 28 on the phase mask 30, and accordingly a bigger curvature can be introduced on the wavefront without being limited by optical properties of the phase mask which would be as observed if the lens were disposed upstream of the phase mask. The use of spaced mirrors 46, 48 to recombine the cylindrical wavefronts 42, 44, provides room to move and tilt the optical fiber 22 as necessary to impart the desired fiber grating. The zero order beam of the phase mask 30 makes the alignment of setup 20 easy and is blocked later without affecting the fabrication of the fiber gratings applied to optical fiber 22.

As the normal grating length is much smaller than the distance between the two virtual point light sources, 2h, and the distance between the optical fiber 22 and the virtual sources 14, 16, i.e. y<<h, and y<<x, (FIG. 1), from equation (1), (5) and (6), an approximate expression is provided by $$\tan\beta = \frac{h}{x}. \quad (13)$$

For normal grating (θ=0), the grating is near-uniform grating, the relation between the Bragg wavelength $\lambda_B$ and the fiber position x from equation (7) and (13) is:

$$x = \frac{h\sqrt{\lambda_B^2 - (n\lambda)^2}}{n\lambda}. \quad (14)$$

Gratings with different Bragg wavelengths can be fabricated by translating the optical fiber 22 within the interference field 50 along the x axis. Translation of the optical fiber 22 by distance Δx results in a change Δβ of the angle at which the grating writing beams e.g., cylindrical wavefronts 42, 44 interfere on the optical fiber 22. From equation (13), $$\Delta\beta = \frac{\sin^2\beta}{h}\Delta x. \quad (15)$$

The following, non-limiting examples are provided to enhance understanding of the present invention.

EXAMPLE I

In Example 1, h≈40 mm and writing angle β for gratings with Bragg wavelength of 1550 nm and 1300 nm are 13.287 and 15.918 degree respectively. To obtain a precision of Δβ=0.001 degree in angle β, the required corresponding precision in displacement x are Δx=13 and 9 μm at 1500 & 1300 nm respectively. The distance between the two mirrors, 2d is 30 mm, and the fiber is set at a distance less than 150 mm from the phase mask. Another cylindrical lens (not shown) was placed before the phase mask 30 to enhance the writing intensity in the fiber.

A conventional micrometer translation stage 60 is used to provide the displacement of the optical fiber along the x axis in contrast to a high precision rotation stage required in a conventional two-beam method to provide a resolution of 0.0005 degree for mirror rotation necessary to impart the same varied Bragg wavelengths.

EXAMPLE II

Continuous-wave laser at 244 nm and 40 mw power (Lexel, model SHG), phase mask of size 10 mm×3 mm and period of 890 nm (QPS Tech. Inc.), and fused silica negative cylindrical lens of −40 mm focal length and size of 60 mm×26 mm are used in the optical setup 20. The phase mask 30 and the lens 36 were set at fixed parameters, and the two mirrors 46, 48 were preset at an angle of 5° facing to the optical fiber to make gratings of wavelength from 900 nm to 1610 nm; and the mirrors 46, 48 were preset at 15 degree facing the lens to make gratings of wavelength from 520 nm to 660 nm.

Testing has shown that there is an almost linear relation between x and $\lambda_B$ in the two wavelength ranges. The position (x) of the optical fiber is changed with a micrometer translation stage 60 on which the optical fiber 22 is set. From equation (14), the Bragg wavelength depends only on the position of the optical fiber 22. Typically for a given position of phase mask 30, gratings with $\lambda_B$ around 1300 nm can be fabricated in a range of 200 nm by only moving the optical fiber 22. For $\lambda_B$ around 600 nm, this range is 30 nm. For fabricating gratings over a larger range of Bragg wavelengths, the phase mask 30 has to be translated along the x axis to enable the interference field ($P_0$) to always on to the optical fiber 22. Translation of the phase mask 30 only moves the interference field 50, without affecting the Bragg wavelength.

A number of Bragg gratings have been fabricated in hydrogen loaded standard telecommunication fibers (SMF-28, Corning) with Bragg wavelength around 1300 nm and ordinary commercial single-mode fibers (F-SV, Newport) with Bragg wavelength around 600 nm. The results were consistent with the equation (14). A few fiber gratings with Bragg wavelength of 632.8 nm for He-Ne laser were also formed. The bandwidth resulting from the chirp was determined by the grating length which was controlled by moving the phase mask 30 to vary the width of the interference field on the fiber.

As should now be apparent to one of ordinary skill in the art, the present invention provides an improved apparatus and method for writing optical fiber filter over a wide range of wavelength which incorporates a phase mask and a cylindrical lens in a two beam interferometric technique. The filter Bragg wavelength can be precisely controlled by one dimensional translation of the optical fiber. The bandwidth of the filter can be modified in a wide range by moving the phase mask 30 and/or the fiber 22 to control the grating length, and/or by changing fiber tilt angle. The alignment adjustment is easy owing to the phase masks zero order beam as an optical axis, which can be blocked later during the fiber grating fabrication. The interference is relatively stable and insensitive to the mechanical vibration due to the high symmetry and compactness of the whole system, the fixed positions of mirrors and lens, and the fixed positions of the two virtual point light sources, which are independent of the translations of the phase mask and the UV laser. By choosing different focal length lenses and/or a few different phase mask, or preset the mirrors with a certain angle, an optical fiber grating with any wavelength bigger than 500 nm can be obtained in a controlled manner using the present invention.

Although the invention has been described above in relation to preferred embodiments thereof, it will be understood by those skilled in the art that variations and modifications can be effected in these preferred embodiments without departing from the scope and spirit of the invention.

What is claimed is:

1. An apparatus for fabricating fiber-optic gratings on an optical fiber, said apparatus comprising:
   a laser adapted to direct a beam of coherent energy along an initial beam path which defines a first axis;
   a phase mask disposed in the initial beam path for diffracting the beam into a first diffracted beam along a first diffracted beam path and a second diffracted beam along a second diffracted beam path, each of said first and second diffracted beam paths having a component in a second axis perpendicular to the first axis;
   a cylindrical lens disposed downstream of the phase mask in both said first diffracted beam path and said second diffracted beam paths second diffracted beams to produce first and second diverged beams in first and second diverged beam paths, respectively; and
   first and second mirrors disposed downstream of said cylindrical lens, for recombining the first and second diverged beams to form an interference field directed to the optical fiber, said first mirror being disposed in the first diverged beam oath and said second mirror being disposed in said second diverged beam path.

2. The apparatus of claim 1, wherein said phase mask is translatable along the first axis.

3. The apparatus of claim 1, further comprising a support for positioning the optical fiber in the interference field.

4. The apparatus of claim 3, wherein said support comprises a translation stage capable of micrometer adjustments of the position of the optical fiber along the first axis.

5. The apparatus of claim 4, wherein said support is further capable of tilting the optical fiber relative to the first axis.

6. The apparatus of claim 1, wherein said mirrors comprise parallel planar mirrors.

7. The apparatus of claim 1, wherein a Bragg wavelength grating to be applied to the optical fiber is adjusted by translating the optical fiber within the interference field along the first axis.

8. The apparatus of claim 7, wherein said phase mask is translatable along the first axis.

9. The apparatus of claim 8, wherein translation of said phase mask along the first axis moves a center position of the interference field along the x axis.

10. The apparatus of claim 1, wherein said cylindrical lens comprises a concave_cylindrical lens.

11. The apparatus of claim 10, wherein said lens is disposed perpendicular to the first axis.

12. A method for fabricating fiber-optic gratings on an optical fiber, said method comprising the steps of:
   directing, along a first axis, a beam of coherent energy to a phase mask element which diffracts the beam of coherent energy into two divergent diffracted beams;
   focusing the two diffracted beams using a lens disposed downstream of the phase mask element to produce first and second diverged beams;
   redirecting the first and second diverged beams to form an interference field using mirrors disposed downstream of the lens; and
   locating an optical fiber in the interference field to form a fiber-optic grating on the optical fiber.

13. The method of claim 12, further comprising the step of translating the phase mask along the first axis to vary a center position of the interference field along the first axis.

14. The method of claim 12, further comprising the step of selecting a desired Bragg wavelength grating to be applied to the optical fiber by varying the distance along the first axis between the optical fiber and the lens.

15. The method of claim 14, further comprising the step of translating the phase mask along the first axis to vary a center position of the interference field along the first axis.

16. The method of claim 12, further comprising the step of tilting the optical fiber in a plane defined by the first axis and a second, orthogonal axis to a predetermined angle relative the first axis to apply a desired chirped grating to the optical fiber.

17. The method of claim 12, wherein said step of focusing the two diffracted beams utilizes a cylindrical lens to form two cylindrical wavefronts.

18. The method of claim 12, wherein the step of redirecting said diverged beams uses first and second planar mirrors disposed in parallel with each other.

* * * * *